(12) United States Patent
Larson et al.

(10) Patent No.: US 7,467,343 B2
(45) Date of Patent: Dec. 16, 2008

(54) APPARATUS AND METHOD FOR PERFORMING A MULTI-VALUE POLLING OPERATION IN A JTAG DATA STREAM

(75) Inventors: Lee A. Larson, Katy, TX (US); Henry R. Hoar, Missouri City, TX (US); Huimin Xu, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 663 days.

(21) Appl. No.: 10/966,660

(22) Filed: Oct. 15, 2004

(65) Prior Publication Data
US 2005/0108595 A1    May 19, 2005

Related U.S. Application Data

(60) Provisional application No. 60/517,460, filed on Nov. 5, 2003.

(51) Int. Cl.
*G01R 31/28* (2006.01)
(52) U.S. Cl. ..................................... 714/736
(58) Field of Classification Search ................ 714/726, 714/733, 736
See application file for complete search history.

(56) References Cited

U.S. PATENT DOCUMENTS

| | | | |
|---|---|---|---|
| 5,144,230 A * | 9/1992 | Katoozi et al. | 324/537 |
| 6,101,622 A * | 8/2000 | Lesmeister | 714/724 |
| 6,182,257 B1 * | 1/2001 | Gillingham | 714/733 |
| 6,314,530 B1 * | 11/2001 | Mann | 714/38 |
| 6,721,905 B2 * | 4/2004 | Ohwada | 714/30 |
| 6,779,145 B1 * | 8/2004 | Edwards et al. | 714/733 |
| 7,360,116 B2 * | 4/2008 | Nakamura | 714/30 |

* cited by examiner

*Primary Examiner*—James C Kerveros
(74) *Attorney, Agent, or Firm*—Wade J. Brady, III; Frederick J. Telecky, Jr.

(57) ABSTRACT

In a test and debug environment using a JTAG protocol to test a target processing unit, apparatus for multi-value polling permits a poll unit, associated with the scan controller, to determine whether one of several possible signal groups is present in the received data stream. The test and debug unit generates a series of numbers, each number corresponding to a preselected signal groups. The corresponding field in the received data stream is decoded to provide a series of output signals, each output signal corresponding to one group. The output signals of the decoder are compared to corresponding numbers of the expected value. When a signal from the decoder unit is found to correspond to one of the selected data number, the poll operation is a success.

14 Claims, 5 Drawing Sheets

APPARATUS AND METHOD FOR PERFORMING A MULTI-VALUE POLLING OPERATION IN A JTAG DATA STREAM

This application claims priority under 35 USC §119 (e) (1) of Provisional Application No. 60/517,460 (TI-36729P) filed Nov. 5, 2003.

FIELD OF THE INVENTION

This invention relates generally to the testing of digital signal processing units, and more particularly to techniques for performing polling operations for signals in specified locations in a target processing unit.

BACKGROUND OF THE INVENTION

As the complexity and number of components on a processing unit chip have increased, the difficulty in testing these chips has increased. One standardized test protocol is the JTAG (Joint Test Action Group) protocol. Referring to FIG. 1, in this test environment, a test and debug unit 5, in response to user inputs applies control and data signals to scan controller 10. The scan control formats the control and data signals and transfers these signals to the target processing unit, the unit under test. The target processing unit 15 performs the activity defined by the control signals and returns the results of the test procedure to the scan control unit 10 with a serial transfer of data. The scan control unit 15 reformats the test result signals from the target processing unit 15 and transfers these signals to the test and debug unit 5 for analysis.

Referring to FIG. 2, a block diagram of the scan controller is shown. The test and debug apparatus enters control signals for the scan controller 10 into the scan controller command register 11. The command register distributes control signals throughout the scan controller 10 to implement the test activity. The test and debug unit 5 also enters test and data signals into input register 12. The test and data signals are entered into the data generator. 14. The data generator 14 reformats the test and data signals and applies the reformatted signals to the target processing unit 8. Data generator 14 exchanges signals with the sequence generator 15. The sequence generator 15, in response to the signals exchanged with the data generator 14 and the control signals received from the command register 11, applies test mode signals to the target processing unit 8. The target processing unit 8, in response to the signals from the data generator 14 and the sequence generator 15, performs the test/debug procedure defined by the test and data signals. After execution of the activity defined by the test and data signals by the target processing unit 8, the results of the test procedure are transferred to the data generator 14. The test result procedure are reformatted and applied to the output register 17. The results of the test procedure are then transferred from the output register to the test and debug unit 5. The test results are then analyzed by the test and debug unit 5 to determine how to proceed with the testing of the target processor.

One common test procedure is "polling". In polling, a value found at a selected location in the target processor is repeatedly examined until an expected value is found at that location. For each access of the selected location, the same signals much be transferred from the test and debug unit 5 to the scan controller 10 to be forwarded to the target processing unit 8. In addition, the value retrieved from the selected location must be transferred to the test and debug unit 5 to determine whether the expected value was found selected. Thus, the polling procedure requires extensive communication between the components of the testing apparatus. Each individual poll of the selected location requires multiple clock cycles before a determination is made whether the procedure must be repeated.

A need has been felt for apparatus and an associated method having the feature of improving the efficiency of the polling operation. It would be a further feature of the apparatus and associated method to provide a comparison between a selected location value and an expected value in the scan controller. It is yet another feature of the present invention, that the polling operation can be implemented in the scan controller without intervention of the test and debug unit. It is still another feature of the present invention to provide apparatus in the scan controller that permits the value retrieved from a selected location to be compared with the expected value in the scan controller. It would be still another feature of the present invention to provide for a plurality of polling operations by the scan controller in response to a command and expected value from the test and debug apparatus. It is a still further feature of the apparatus and associated method to provide for the polling of a plurality of signals groups in the received data stream in a single operation.

SUMMARY OF THE INVENTION

The aforementioned features are accomplished, according to the present invention, by apparatus that permits the polling procedure, in response to a predetermined command, to be implemented without interaction with the test and debug apparatus. A command, a preselected sum, and at least one expected value indicative of a plurality of logic values are transferred to and stored in the scan controller. The expected value register in the scan controller has plurality of locations, each location representing a group of logic values. A decoder unit in the scan controller receives a group of signals from the received data stream from the target processing unit. The decoder unit decodes the group of signal from the received data stream in such a manner as to correspond to the location in the expected value register. The logic signal or signals stored in location in the expected value register are compared to a signal from the decoder unit. When a signal representing a group of logic values in a location in the expected value register corresponds to a decoder unit signal representing the same group of logic values, the poll operation provides a success signal for the test and debug unit. The present apparatus permits the group of logic signals from the received signal group to be compared to a plurality of expected logic values.

Other features and advantages of present invention will be more clearly understood upon reading of the following description and the accompanying drawings and the claims.

DESCRIPTION OF THE PREFERRED EMBODIMENT

Detailed Description of the Figures

Figure 1:
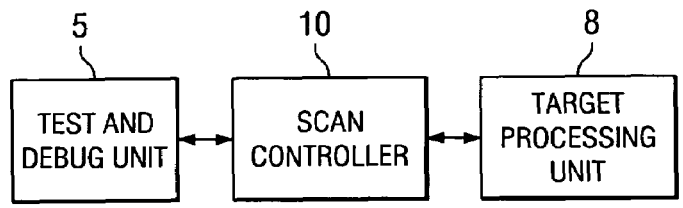
FIG. 1 is a block diagram of the configuration for testing a target processing unit using the JTAG protocol according to the prior art.
Figure 2:
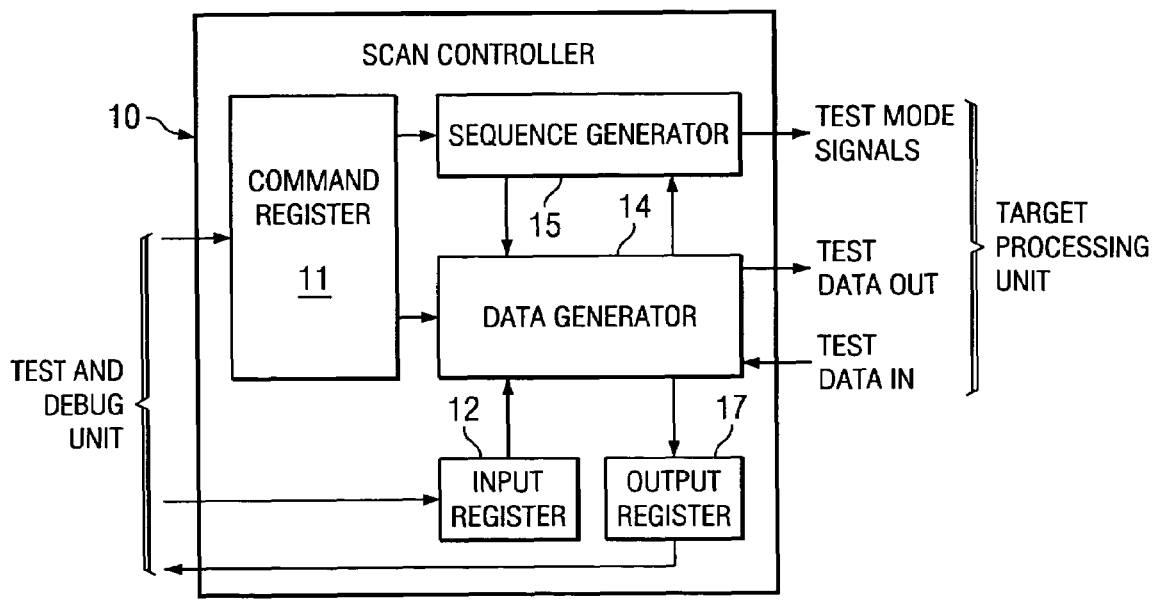
FIG. 2 is a block diagram of a scan controller according to the prior art.

FIG. 1 and FIG. 2 have been described with respect to the prior art.

Figure 3:
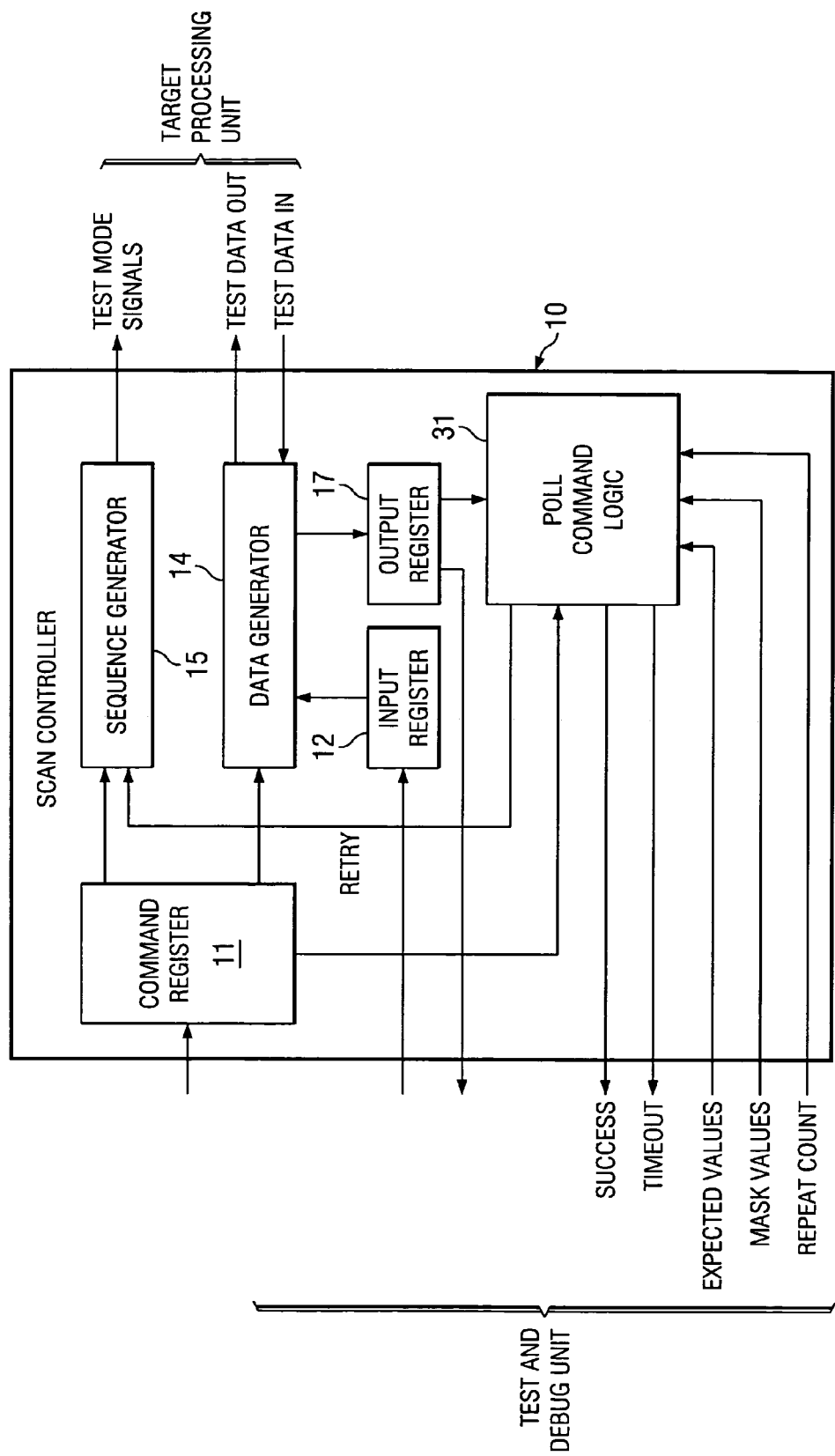
FIG. 3 is a block diagram of scan controller according to the present invention.

Referring to FIG. 3, a block diagram of the scan controller 30 according to the present invention is shown. The scan controller 30 includes the command register 11, the sequence generator 15, the data generator 14, the input register 12 and the output register 17 as shown in FIG. 2. In addition, the scan controller 30 includes the poll command logic 31. The poll command logic 31 receives command signals from command register 11, and signals from the output register 17. The poll command logic 31 applies a retry signal to the sequence generator 15. The poll command logic applies a success and a timeout signal to the test and debug unit, the success and timeout signals indicating to the test and debug unit whether the polling operation has been successful or not. The poll command logic unit 31 receives an expected values signal, a mask values signals, and a repeat count signal from the test and debug unit.

Figure 4:
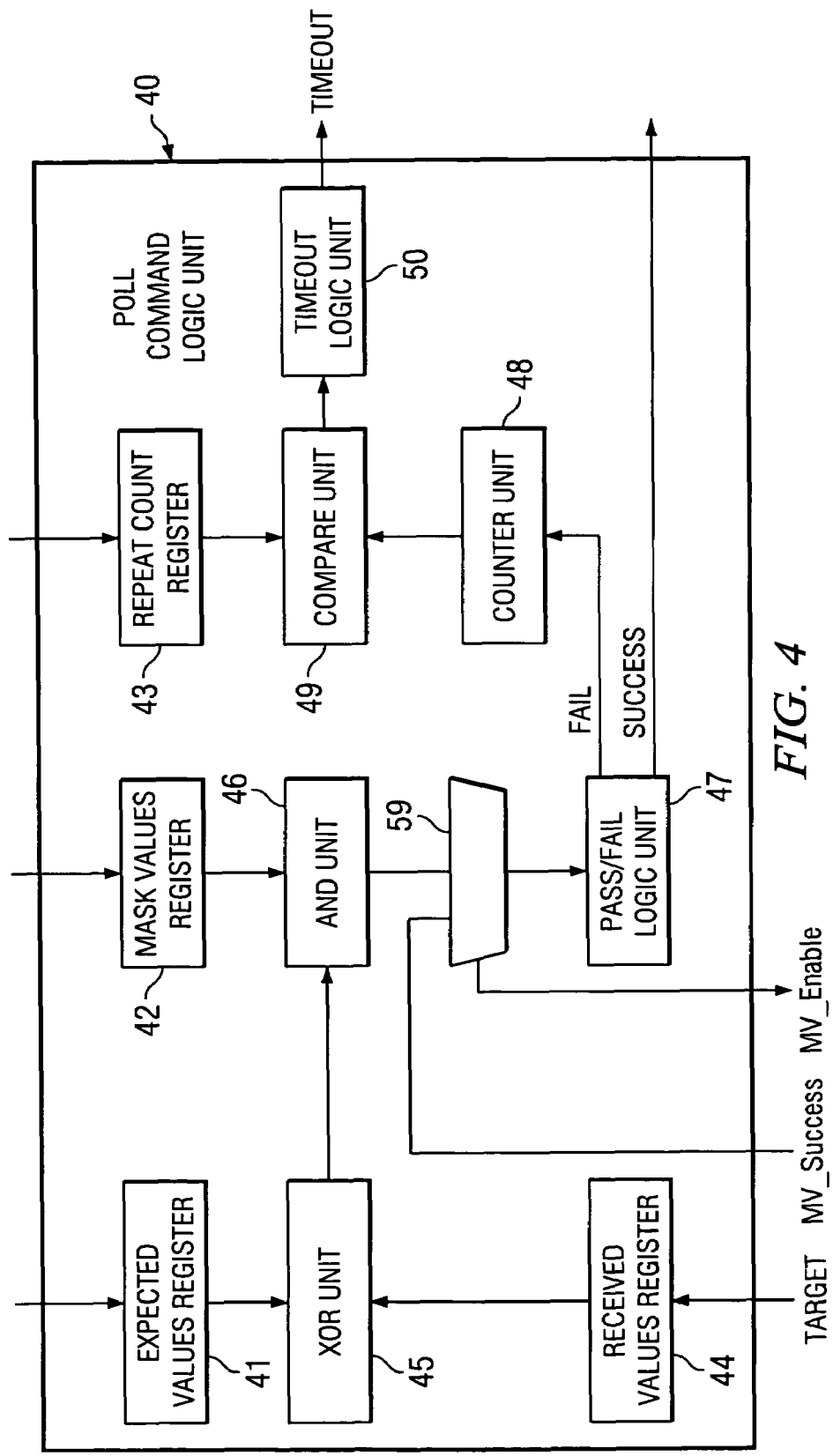
FIG. 4 is a block diagram of a poll command unit according to the prior art.

Referring to FIG. 4, a functional block diagram of the poll command logic unit 40, according to the present invention, is shown. The expected value, i.e., the value that is being sought by the polling operation, is entered in the expected values register 41 by the test and debug unit. Similarly, the test and debug program loads any mask values in the mask values register 42 and loads the repeat count into the repeat count register 43. In response to the transfer of a data signal group from the scan control unit to the target processing unit, a signal group is returned from the target processing unit and entered in the received values register 44. The value in the expected values register 41 and the value in the received values register 4 are applied to logic EXCLUSIVE-OR unit 45. The output signal from logic EXCLUSIVE-OR unit 45 and the signal from the mask values unit are applied to logic AND unit 46. The output signal from the logic AND gate 46 is applied to pass/fail logic unit 47. The pass/fail logic unit 47 generates either a pass signal or a fail signal depending on the signal applied thereto. When a fail signal is generated, this signal is applied to counter unit 48. The counter unit 48 has a count value stored therein incremented by one. The count value stored in the counter unit 49 and the repeat count stored in repeat counter register 43 are applied to compare unit 49. The output signal of compare unit 49 is applied to timeout logic unit 50. When preselected conditions are met, the timeout logic unit 50 issues a time out signal. Multiplexer 59 allows the multi-value poll operation to be performed instead of a general poll operation.

Figure 5:
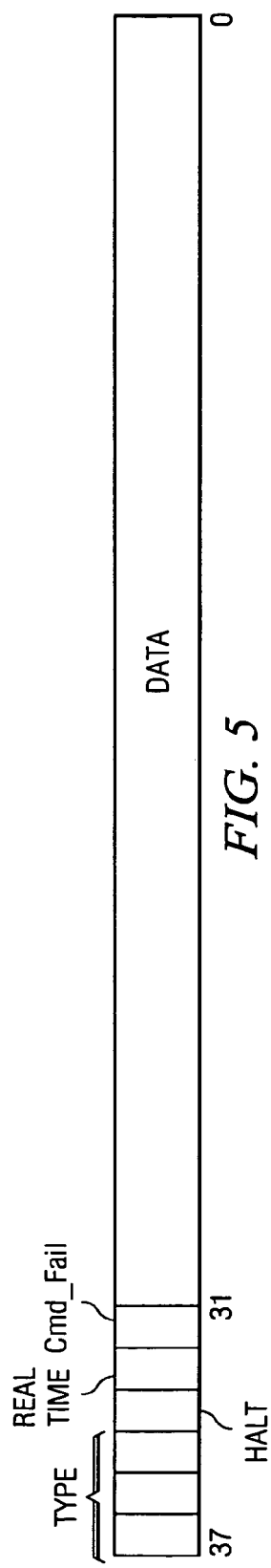
FIG. 5 illustrates the format of the received data stream according to the present invention.

Referring to FIG. 5, a format for the received data stream from the target processor is shown. The received data stream consists, in the preferred embodiment, of 38 logic values. 32 of the logic values are the data. Two values describe Real_Time and Halt parameters. A separate value identifies and Cmd_Fail parameter. The three remaining values describe the type of data being transmitted. The type parameter is the field that is being polled in the present invention.

Figure 6:
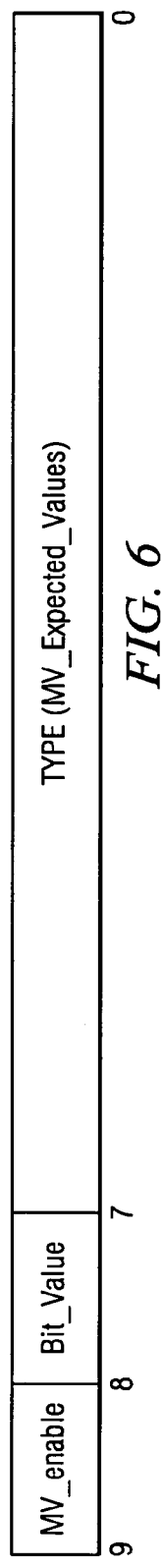
FIG. 6 illustrates the format of the expected value register according to the present invention.

Referring to FIG. 6, the format of the expected value register is shown. The expected value register includes a field with 8 values, each of the 8 values corresponds to one of the 3-bit types of FIG. 5. The other two values are the Bit_Value field and the Multi_Value_Poll_Enable.

Figure 7:
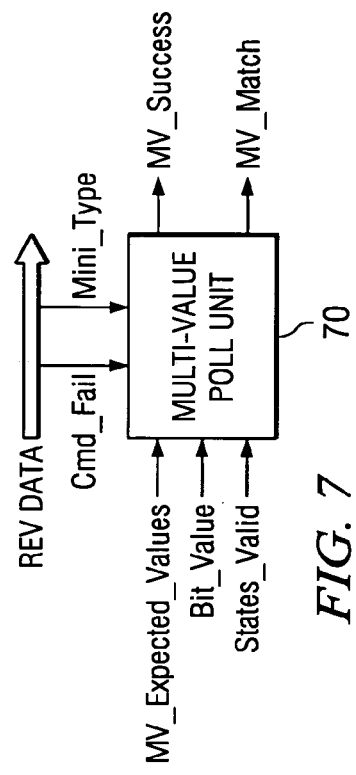
FIG. 7 illustrates the signals applied to the MultiValue poll unit according to the present invention.

Referring to FIG. 7, the signals applied to the multi-value poll unit 70 is shown. From the received data stream of FIG. 5, the Cmd_Fail value and the 3-bit type values are applied to the multi-value poll unit 70. The MV_EXPECTED_Values signal, the Bit_Value signal and the Status_Valid signal are also applied to the multi-value poll unit. The multi-value poll unit generates the MV_Success signal and the MV_Match signal.

Figure 8:
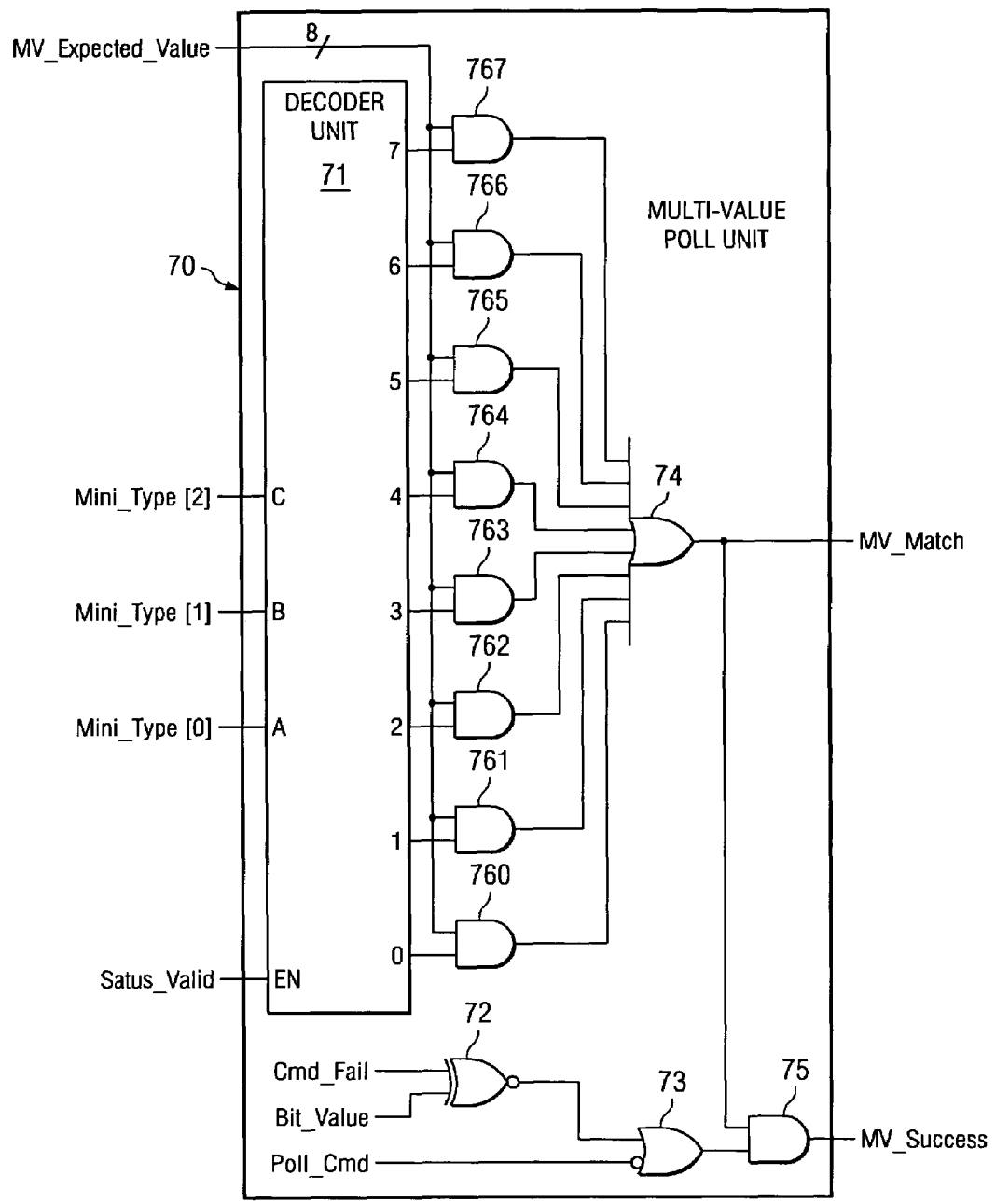
FIG. 8 is a block diagram of the multi-value poll unit according to the present invention

Referring next to FIG. 8, a block diagram of the multi-value poll unit is shown. From the received data stream register of FIG. 5, the three values in the type field, mini_type [2], mini_type [1], and mini_type [0] are applied to input terminals C, B, and A respectively of the decoder unit 71. The Status_Valid signal is applied to the en(able) terminal of decoder 71. As a result of the decoder unit activity, the decoder unit 71 generates an output signal on one of the terminal 0 through 7. The decoded mini_type signals will correspond to one of the expected type values in the type field of the expected values register of FIG. 6. The output terminals 0 through 7 are coupled to a first input terminal of logic AND gates 760 through 767. The output terminal of logic AND gate 760 through 767 are coupled to input terminals of logic OR gate 74. The second input terminal of each of logic AND gates 760 through 767 is coupled to one of the values in the type field of expected values register of FIG. 6. The output terminal of logic OR gate 74 is the MV_Match signal. The Cmd_Fail signal is applied to a first terminal of logic EXCLUSIVE NOR gate 72, while the Bit_Value signal is applied to the second input terminal of logic EXCLUSIVE NOR gate 72. The output terminal of logic EXCLUSIVE NOR gate is applied to a first terminal of logic OR gate 73, while a Poll_Command signal is applied to an inverting terminal of logic OR gate 73. The output terminal of logic OR gate is coupled to a first input terminal of logic AND gate 75, while the output terminal of logic OR gate 74 is coupled to a second input terminal of logic AND gate 75. The output signal of logic AND gate 75 supplies the MV_Success signal indicative of a successful polling operation.

Operation of the Preferred Embodiment

The operation of the present invention can be understood as follows. In identifying a data type, three bits are used, allowing up to eight possible data types. The test and debug assigns a value of 0-7 for each of the possible data types. A logic signal is placed in the expected value register of FIG. 6 corresponding to the assigned number. Similarly, the decoder unit decodes the three type values in the received data stream and applies a resulting signal to a terminal corresponding to assignments of three type bits in the expected value register. Because the assignments of the three type bits is the same in the expected value register and in the decoder unit, a signal at both input terminals of one of the eight logic AND gates indicates that the type value in the received data stream is the same as the type value in the corresponding location in the expected value register. Thus, the generation of an output signal at one of the logic AND gates indicates that one of the date types being polled for is present in the target processing unit.

The group of logic values in the received data stream that is being polled can be compared with a plurality of expected logic value groups. In the present embodiment, the type (of data) field, a three bit field is compared with at least one expected (three bit) type of data fields. It will be clear that this technique can be used to poll multiple examples of larger groups of data values. Note that the comparison of the expected data type and data type identified by the received data stream is performed in the scan controller itself and not in the test and debug unit.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A poll unit for use in polling operations of a test and debug system, the poll unit receiving expected value signals from a test and debug unit, the poll unit responsive to a received data stream from a target processor, the poll unit being included in a scan controller, the poll unit comprising:
   a scan controller poll unit expected value register comprising a plurality of data type fields, wherein a value stored in each type data field indicates whether a corresponding data type is included in a polling operation;
   a decoder unit, the decoder unit having a group of logic values from the received target processor data stream applied thereto, the decoder unit providing an output signal corresponding to each group of logic values, wherein each output signal of the decoder unit corresponds to a data type field of the expected value register; and
   a comparison unit, the comparison unit determining whether the output signal from the decoder unit represents data type included in the polling operation.

2. The poll unit as recited in claim 1, wherein the decoder unit output signal is compared to signals provided from each of the plurality of data type fields of the expected value register.

3. The poll unit as recited in claim 1, wherein a polling operation initiated by the test debug unit causes the poll unit to repeat a previous polling operation without further intervention by the test debug unit.

4. The poll unit as recited in claim 1, wherein a polling operation is initiated when a previous polling operation is not successful.

5. A method of providing a polling operation in which a plurality of expected data types are compared to a logic value group in a received data stream in a JTAG protocol scan controller of a test and debug system; the method comprising:
   associating each field of a plurality of register fields of a scan controller expected value register with a data type, wherein a value indicative of inclusion in a polling operation is stored in each field associated with an expected data type;
   decoding a group of logic values from a received target processor data stream to provide a resulting signal, wherein each resulting signal corresponds to a field of the expected value register; and
   comparing the resulting signal with a signal provided from a field of the scan controller expected value register.

6. The method as recited in claim 5, wherein the comparing step includes comparing the resulting signal with a plurality of signals representing expected data types.

7. The method as recited in claim 5 further comprising generating a success signal when the comparing step is successful.

8. The method as recited in claim 7 further comprising the step of repeating the polling operation when a success signal is not generated after a polling operation.

9. The method as recited in claim 5, wherein the test and debug system includes a test and debut unit coupled to the scan controller, a polling operation initiated by the test and debug unit causes a repeat of a previous polling operation without further intervention by the test and debug unit.

10. A test and debug system using a JTAG protocol for testing a target processor, the system comprising:
    a test and debug unit; and
    a scan controller responsive to the test and debug system for implementing a polling operation, the scan controller including:
      a poll unit, the poll unit having:
        an expected value register comprising a plurality of data type fields, each field associated with a data type, wherein each field associated with an expected data type has a value stored therein indicating that the data type is included in a polling operation;
        a decoder unit receiving selected logic values from the received data stream of a target processing unit, the decoder unit providing a resulting signal corresponding to the selected logic values: wherein the resulting signal corresponds to a data type field of the expected value register; and
        a comparison unit comparing the resulting signal with a logic signal from a data type field of the expected value register, a positive comparison providing a successful polling operation.

11. The system as recited in claim 10, the scan controller repeating the polling operation when the polling operation is not successful.

12. The system as recited in claim 10 wherein the resulting signal is compared with a plurality of signals provided from the data type fields of the expected value register.

13. The system as recited in claim 10, wherein a polling operation initiated by the test and debug unit causes repeat of a previous polling operation without further intervention by the test and debug unit.

14. The system as recited in claim 10 wherein the polling operations are halted after a predetermined number of polling operations.

* * * * *